(12) United States Patent
Medina

(10) Patent No.: US 6,985,974 B1
(45) Date of Patent: Jan. 10, 2006

(54) MEMORY INTERFACE CONTROLLER FOR A NETWORK DEVICE

(75) Inventor: Eitan Medina, Ramat Hasharon (IL)

(73) Assignee: Marvell Semiconductor Israel Ltd., Yokneam (IL)

( * ) Notice: Subject to any disclaimer, the term of this patent is extended or adjusted under 35 U.S.C. 154(b) by 265 days.

(21) Appl. No.: 10/167,000

(22) Filed: Jun. 10, 2002

Related U.S. Application Data

(60) Provisional application No. 60/370,645, filed on Apr. 8, 2002.

(51) Int. Cl.
*G06F 3/00* (2006.01)

(52) U.S. Cl. .............................. 710/52; 710/1; 710/56; 710/62; 709/223; 709/226; 711/170; 711/171

(58) Field of Classification Search ................ 710/1, 710/52–62; 709/223–226, 230–238; 711/170–173
See application file for complete search history.

(56) References Cited

U.S. PATENT DOCUMENTS

| | | | |
|---|---|---|---|
| 5,398,245 A | 3/1995 | Harriman, Jr. | |
| 5,752,078 A | 5/1998 | Delp et al. | |
| 5,778,414 A | 7/1998 | Winter et al. | |
| 5,787,255 A | * 7/1998 | Parlan et al. | ................ 709/233 |
| 5,948,079 A | 9/1999 | Tsai et al. | |
| 5,999,981 A | 12/1999 | Willenz et al. | |
| 6,678,746 B1 | * 1/2004 | Russell et al. | ................ 710/1 |

OTHER PUBLICATIONS

U.S. Appl. No. 10/000,944.

* cited by examiner

*Primary Examiner*—Kim Huynh
*Assistant Examiner*—Mike Nguyen

(57) ABSTRACT

A network device receives data packets from a network adaptor. A low latency memory has a first read/write performance. A high latency memory has a second read/write performance that is slower than the first read/write performance of the low latency memory. An interface controller uses an address check circuit and values stored in registers to determine whether a read or write operation relates to header portions of the data packets. The interface controller stores header portions of the data packets in the low latency memory and data portions of the data packets in the high latency memory. The registers include base address, buffer pool size, maximum individual buffer size, and header size registers. Alternately the registers include base address, mask, maximum individual buffer size, and header size registers.

34 Claims, 5 Drawing Sheets

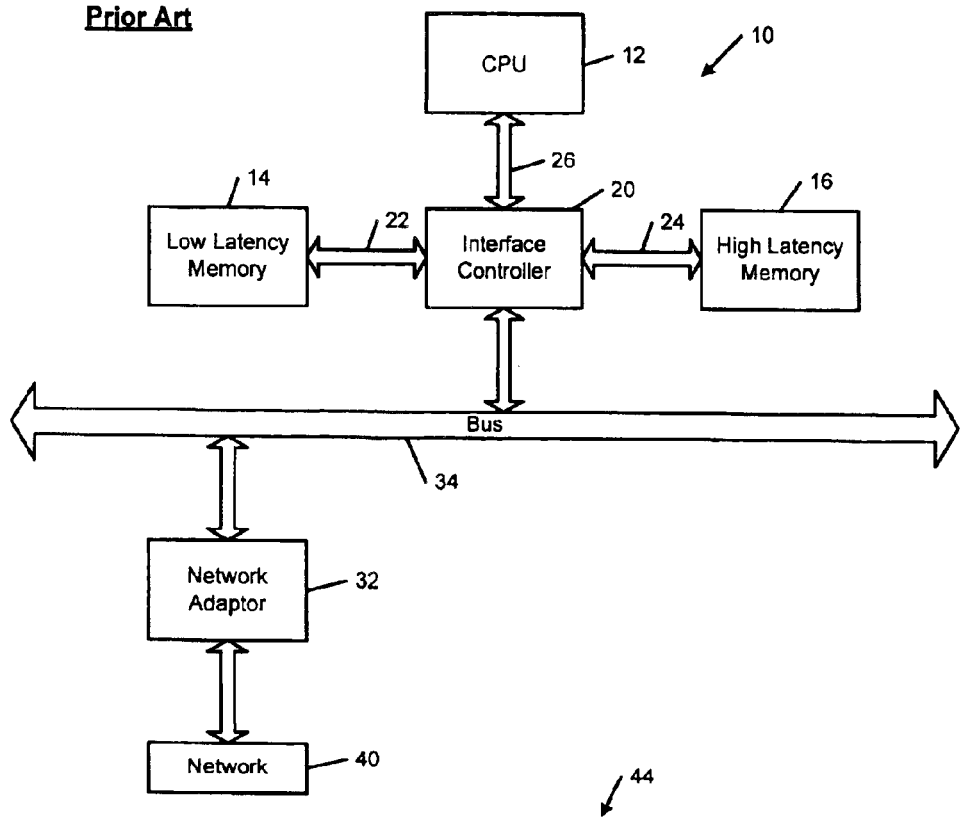
FIG. 1
Prior Art
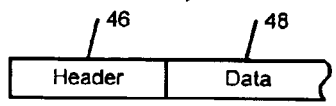
FIG. 2
Prior Art
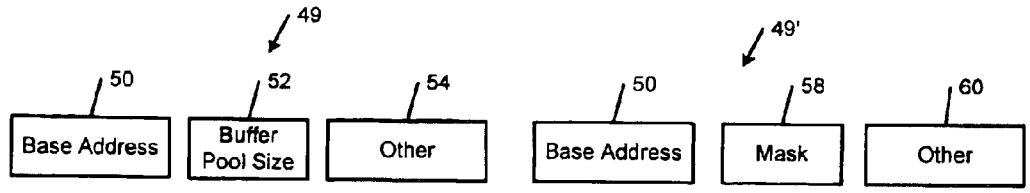
FIG. 3
Prior Art
FIG. 4
Prior Art

MEMORY INTERFACE CONTROLLER FOR A NETWORK DEVICE

CROSS-REFERENCE TO RELATED APPLICATIONS

This application claims the benefit of U.S. Provisional Application No. 60/370,645, filed Apr. 8, 2002, which is hereby incorporated by reference.

FIELD OF THE INVENTION

The present invention relates to interface controllers, and more particularly to memory interface controllers for networking devices.

BACKGROUND OF THE INVENTION

Referring now to FIG. 1, a network device 10 is shown that includes a central processing unit (CPU) 12 and low latency and high latency memories 14 and 16. An interface controller 20 communicates with the low latency and high latency memories 14 and 16 via buses 22 and 24, respectively. The interface controller 20 communicates with the CPU 12 via bus 26. A network adaptor 32 communicates with the interface controller 20 via a bus 34. The CPU 12 processes data and communicates with the low latency memory 14, the high latency memory 16, and/or the bus 34 through the interface controller 20. The network adaptor 32 facilitates communications between a network 40 and the CPU 12 via the bus 34.

In the network device 10, the low latency memory 14 generally has higher performance than the high latency memory 16. For example, the low latency memory 14 can be static random access memory (SRAM), which has relatively fast read/write access times and a relatively high cost. The low latency memory 14 can be embedded or external. The high latency memory 16 has slower read/write access times and is typically less expensive than the low latency memory. For example, the high latency memory 16 can be dynamic random access memory (DRAM).

Due to the cost difference, the memory capacity of the low latency memory 14 is usually substantially lower than the memory capacity of the high latency memory 16. In other words, while it is desirable to have as much of the low latency memory 14 as possible to improve performance, the cost of the low latency memory 14 usually requires a trade-off between system cost and performance. Usually, substantially more of the high latency memory 16 is used due to its lower cost. In addition, the smaller physical size of the low latency memory 14 allows it to be located near the interface controller 20 or embedded on the same chip as the interface controller 20. The proximity of the low latency memory 14 further improves data access times.

Referring now to FIG. 2, in networking applications, data is typically communicated in data packets 44 that include a header portion 46 and a data portion 48. The header portion 46 includes instructions, such as routing, protocol and other information, for the data portion 48.

When the CPU and/or the network adaptor 32 read from or write to the high latency memory 16, the interface controller 20 uses two conventional approaches. In a first approach, a base address and a buffer pool size are specified by a descriptor control structure and are stored in registers of the interface controller 20. In a second approach, a base address register and mask are specified by the descriptor control structure and are stored in registers of the interface controller.

The values stored in the base address register and the buffer pool size or mask register are used by the CPU 12 and the interface controller 20 when storing and retrieving the packets from the high latency memory 16. The descriptor control structure is prepared by the driver software that runs the CPU 12. The descriptor control structure is used by the hardware-based direct memory access (DMA) engine to read/write data packets to/from the high latency memory 16.

In FIG. 3, registers 49 of the interface controller 20 for the first approach are shown. The registers 49 include a base address register 50, a buffer pool size register 52, and/or other optional descriptor registers 54 (if any). In FIG. 4, registers 49' of the interface controller 20 for the second approach are shown. The registers 49' include a base address register 50, a mask register 58, and/or other optional descriptor registers 60 (if any).

The network adaptor 32 receives instructions from the CPU 12 based on the registers 49 or 49'. The CPU 12 instructs the network adaptor 32 where to write the data packets in the high latency memory. The data packets 44 are sent from the network 40 through the network adaptor 32 to the network device 10. The data packets 44 are then stored in the high latency memory 16 based on the instructions from the CPU 12.

The low latency memory 14 is not used for the data packets 44 due to the large size of the data packets 44 and the relatively-low capacity of the low latency memory 14. Reading and writing access times that are required by the CPU 12 are adversely impacted by the relatively low data read/write speeds of the high latency memory 16.

SUMMARY OF THE INVENTION

A network device according to the present invention receives data packets. A low latency memory has a first read/write performance. A high latency memory has a second read/write performance that is slower than the first read/write performance of the low latency memory. An interface controller communicates with the low latency memory and the high latency memory, receives the data packets, and stores header portions of the data packets in the low latency memory and data portions of the data packets in the high latency memory.

In other features, a central processing unit (CPU) and a network adaptor communicate with the interface controller and read from and write to the data packets. The interface controller further includes an address check circuit that determines whether a read address from the CPU or the network adaptor is associated with one of the header portions that is stored in the low latency memory. If the read address is associated with one of the header portions, the interface controller reads the header portion from the low latency memory.

In still other features, the address check circuit determines whether a write address from the CPU or the network adaptor is associated with a header portion. If the write address is associated with the header portion, the interface controller writes the header portion to the low latency memory.

In yet other features, the address check circuit uses registers of the interface controller to identify addresses corresponding to the header portions. The registers include a base address register, a buffer pool size register, a maximum individual buffer size register, and a header size register. Alternately, the registers include a base address register, a mask register, a maximum individual buffer size register, and a header size register.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a functional block diagram of a network device with an interface controller according to the prior art;

FIG. 2 illustrates a data packet including header and data portions according to the prior art;

FIG. 3 illustrates registers of the interface controller that include a base address register and a buffer pool size register according to the prior art;

FIG. 4 illustrates registers of the interface controller that include a base address register and a mask register according to the prior art;

DETAILED DESCRIPTION OF THE PREFERRED EMBODIMENTS

Figure 5:
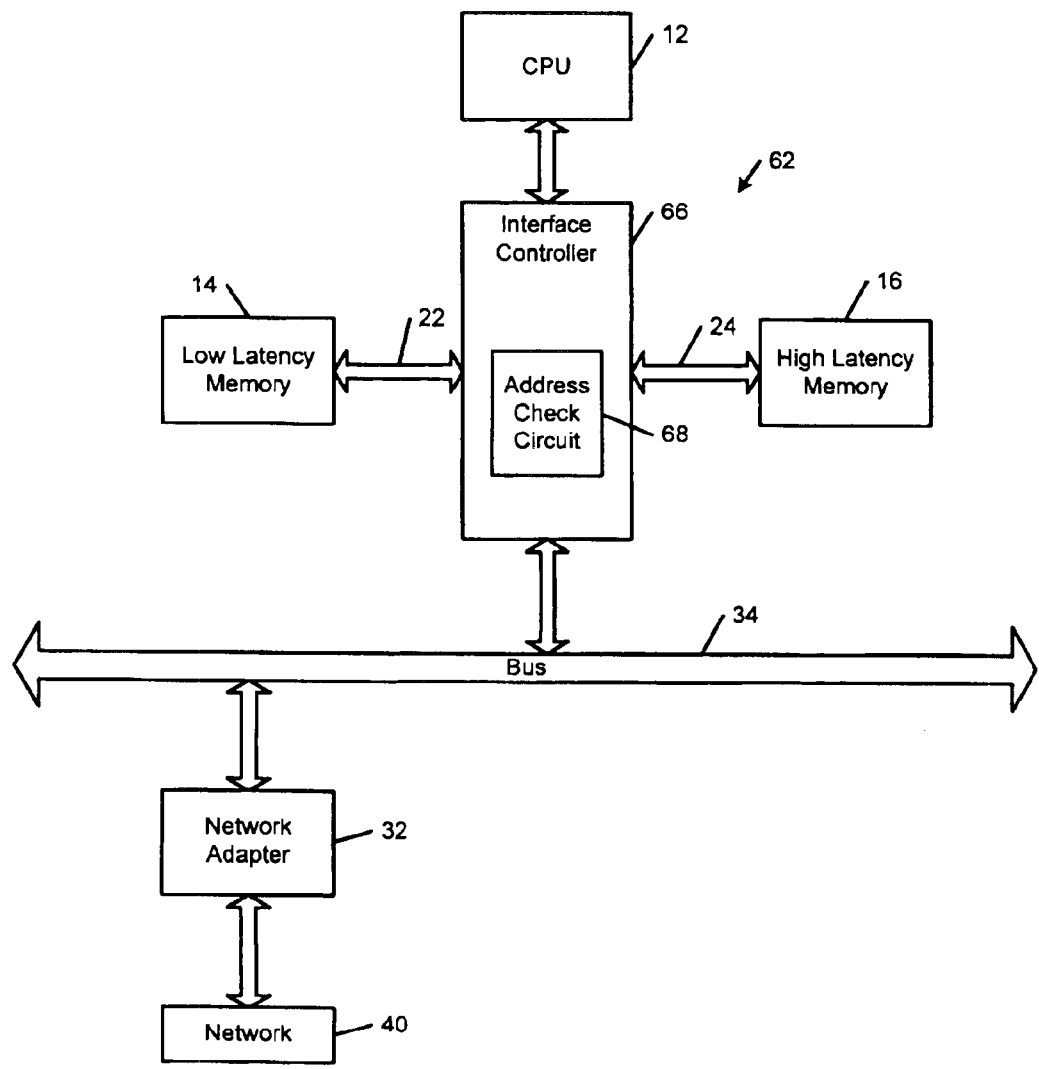
FIG. 5 is a functional block diagram of a network device with an interface controller according to the present invention.

The following description of the preferred embodiment(s) is merely exemplary in nature and is in no way intended to limit the invention, its application, or uses. For purposes of clarity, the same reference numbers will be used in the drawings to identify similar elements.

In networking applications, the header portion 46 of the data packet 44 provides information that is required by the CPU 12 for making routing and protocol decisions and additional processing of the data packet 44. The header portion 46 is relatively small as compared to the overall size of the data packet 44. The CPU 12 frequently reads the header portions 46 of the data packets 44. Performance is significantly improved if the CPU 12 can access the header portion 46 of the data packet 44 more quickly. The improved performance is particularly advantageous in switches and routers that make decisions on L2 and L3 information in the data packet 44.

The network device includes an interface controller that writes the header portions 46 of the data packets 44 to and/or reads the header portions 46 from the low latency memory 14. The data portion 48 of the data packet 44 is written to and read from the high latency memory 16. The low latency memory 14 has faster read/write access times than the high latency memory 16. As a result, the CPU 12 can access the header portions 46 more quickly.

The interface controller according to the present invention preferably uses a continuous buffer pool. The interface controller allocates a maximum size individual buffer for each buffer. By knowing a header portion size and the buffer pool size or mask of the buffer memory, the interface controller can determine whether a read/write address is associated with a header portion. If it is, the interface controller reads/writes the header portion from/to the low latency memory.

The network device according to the present invention does not require modification to the network adaptor 32 or the network adaptor driver software. As a result, the cost of implementing the improved network device according to the present invention is reduced. The present invention improves the performance of switches, routers and other network devices based on existing network adaptors and network adaptor driver software.

Referring now to FIG. 5, a network device according to the present invention is shown at 62. The network device 62 includes a CPU 64 and the low latency and high latency memories 14 and 16. An interface controller 66 according to the present invention communicates with the low and high latency memories 14 and 16 via buses 22 and 24. The interface controller 66 communicates with the CPU 64 via the bus 26. The network adaptor 32 communicates with the interface controller 66 via the bus 34.

The interface controller 66 includes an address check circuit 68 that monitors read and/or write addresses from the CPU 12 and/or the network adaptor 32. If the read and/or write address is associated with the header portion 46 (or the header portion 46 and the data portion 48), the header portion 46 is written to and/or read from the low latency memory 14 (or the header portion 46 is written to or read from the low latency memory 14 and the data portion is read from or written to the high latency memory 16). Otherwise, the data portion 48 is read from and/or written to the high latency memory 16. The address check circuit 68 can be implemented in combinatorial logic, software that is executed by a processor, one or more discrete circuits or in any other suitable manner.

The interface controller 66 according to the present invention modifies the two conventional approaches described above. In a first modified approach, the maximum individual buffer size and the header size values are stored in registers along with the base address and the buffer pool size values that are specified by the descriptor control structure and are also stored in registers. In a second modified approach, the maximum individual buffer size and the header size values are stored in registers along with the base address and the memory mask values that are specified by the descriptor control structure and are also stored in registers. As can be appreciated, the buffer pool size may be specified in any way that will allow the size of the buffer pool to be determined. For example, the number of buffers can be specified (the buffer pool size is equal to the number of buffers times the maximum individual buffer size) or an end address of the buffer memory can be specified.

Figure 6:
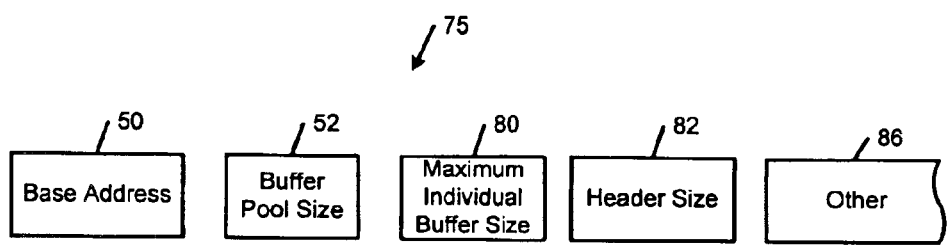
FIG. 6 illustrates registers of the interface controller according to the present invention that include a base address register, a buffer pool size register, a maximum individual buffer size register, and a header size register.
Figure 7:
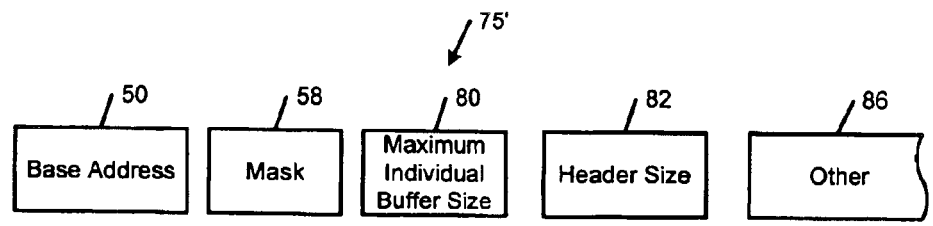
FIG. 7 illustrates registers of the interface controller according to the present invention that include a base address register, a mask register, a maximum individual buffer size register, and a header size register.

In FIG. 6, registers 75 of the interface controller 66 are shown further and include the base address register 50, the buffer pool size register 52, a maximum individual buffer size register 80, a header size register 82, and/or the other optional or required descriptor registers 86 (if any). In FIG. 7, registers 75' of the interface controller 66 are shown further and include the base address register 50, the mask register 58, the maximum individual buffer size register 80, the header size register 82, and/or the other optional or required descriptor registers 86 (if any).

The maximum individual buffer size register 80 contains the maximum individual buffer size for each data packet 70. Preferably, the maximum individual buffer size is a multiple of $2^n$. However, other maximum individual buffer sizes can be used. The maximum individual buffer size can have several modes. For example, a maximum individual buffer size can have the following modes: 256, 512, and 2048 bytes, although other sizes are contemplated. The header size register 82 contains the size of the header portion 72. For example, the header size can be 32, 64 or 128 bytes, although other header sizes are contemplated.

The interface controller 66 monitors read or write requests received from the CPU 12 or the network adaptor 32. If read or write access to the header portion 46 is requested as determined by the address check circuit 68, the interface controller 66 automatically reads or writes from/to the header portion 46 in the low latency memory 14 in a manner that is transparent to the CPU 12 and the network adaptor 32.

For example, data packets 44 received via the network adaptor 32 have a size that varies between 64 B and 1.536 kbytes (commonly referred to as 1.5 kB). The header size is 64 B. 1,024 packet buffers with 2,048 B are assigned in the high latency memory 16. In other words, the interface controller 66 assigns 1,024×2,048 B=2,091,752 B (or 2 MB) of space in the high latency memory 16 for the data packets 44. The interface controller 66 assigns 64 B×1024=65,536 B (or 64 kB) in the low latency memory 14.

As the data packets 44 are received from the network adaptor 32, the interface controller 66 monitors the addresses to determine whether a header read or write to a header portion is involved. When the network adaptor 32 is writing data packets 44 that include header portions 46, the address check circuit 69 of the interface controller 66 recognizes the write addresses of the header portions 46. The interface controller 66 stores the header portions in the low latency memory 14 and the data portions 48 in the high latency memory 16.

When the CPU 12 or the network adaptor 32 subsequently read from and/or write to the data packets 44, the address check circuit 68 determines whether the read/write address corresponds to a header portion 46. If it does, the header portion 46 is read from and/or written to the low latency memory 14.

Figure 8:
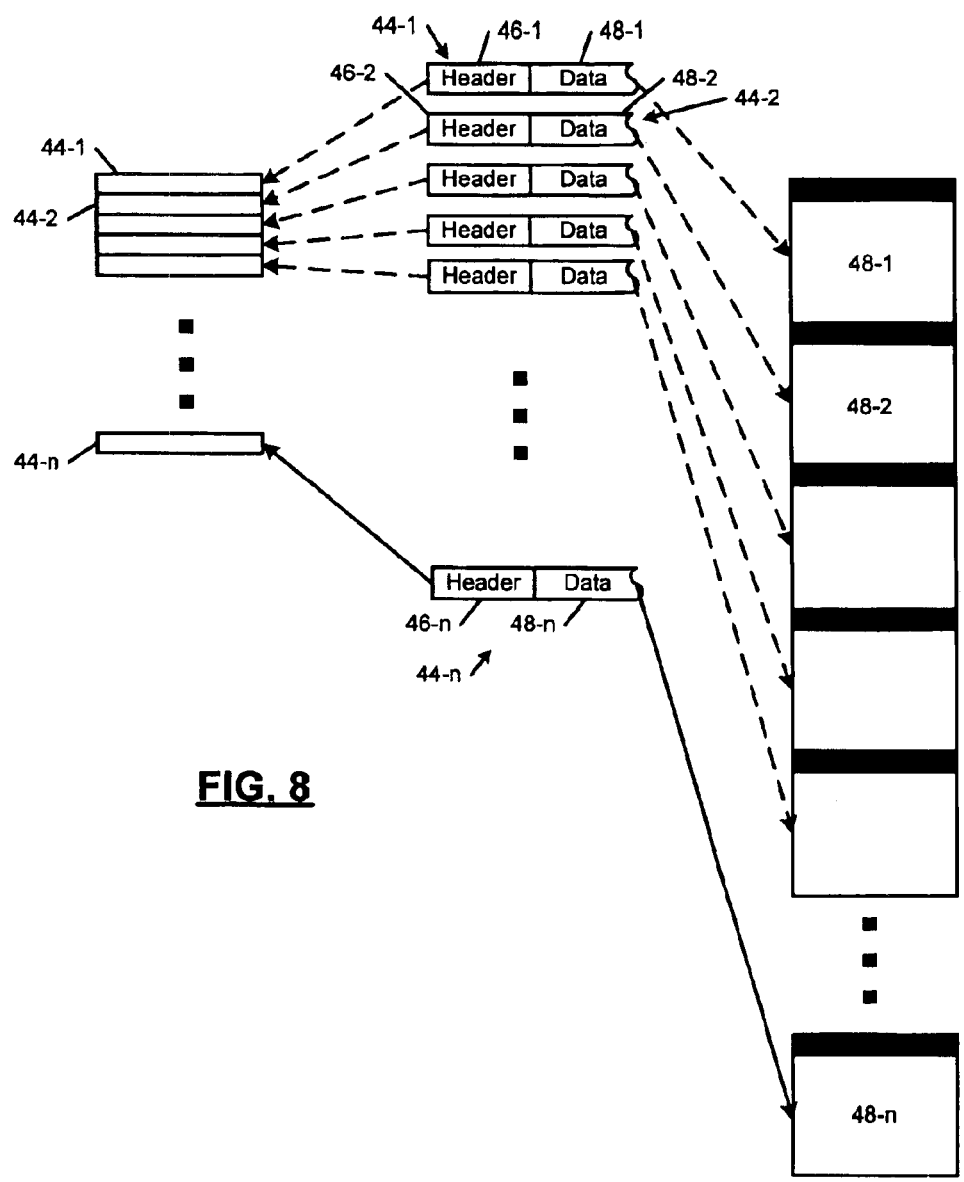
FIG. 8 illustrates the storage of the header portion of the data packet in the low latency memory and the data portion of the data packet in the high latency memory.

Referring now to FIG. 8, as n data packets 44-1, 44-2, . . . , and 44-n are received, the interface controller 66 stores the header portions 46-1, 46-2, . . . , and 46-n in the low latency memory 14 and the data portions 48-1, 48-2, and 48-n in the high latency memory 16. As can be appreciated, the header portions 46 are either not stored or stored redundantly in the high latency memory 16. The inefficient use of the high latency memory 16 (e.g. storing no data in blocks assigned to the header portions) is offset by the lower cost of the high latency memory 16.

Figure 9:
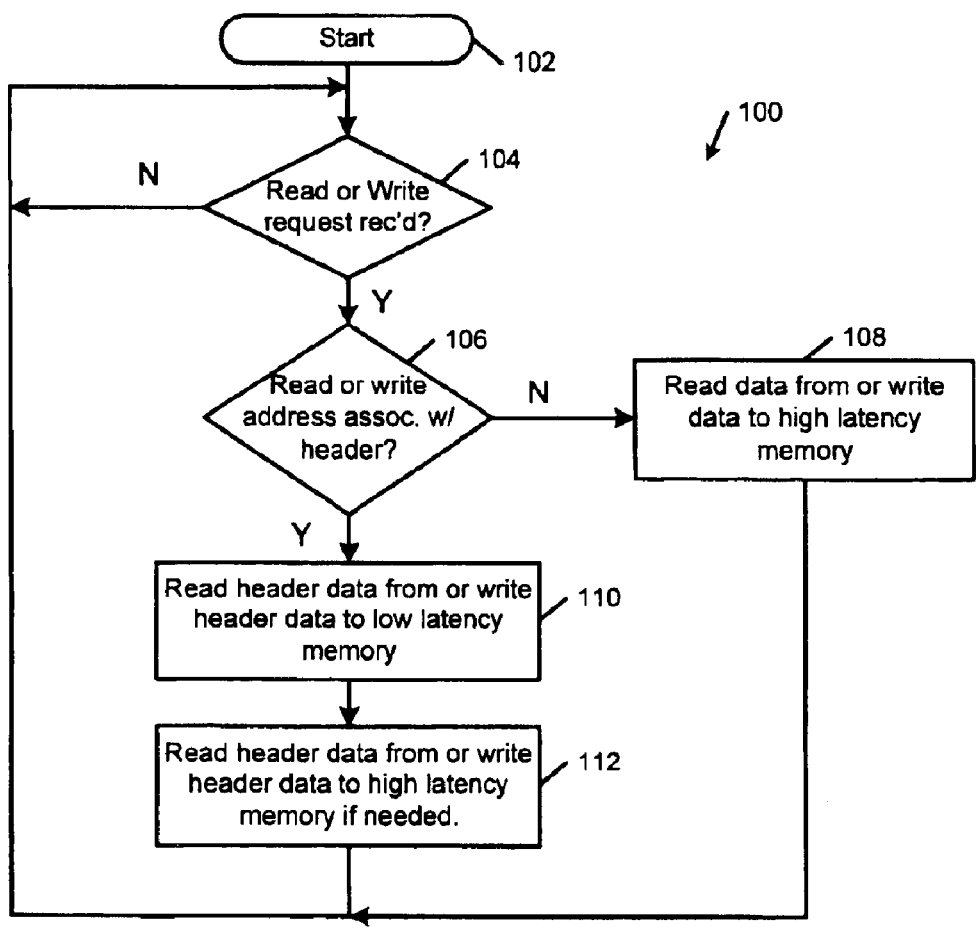
FIG. 9 is a flowchart illustrating steps that are performed by the interface controller.

Referring now to FIG. 9, steps performed by the interface controller 66 are shown at 100. Control begins with step 102. In step 104, the interface controller 66 determines whether a read or write request is received. The read or write request can be received from the CPU 12 and/or the network adapter 32. A write request can include receipt of the data packets 44 from the network adaptor 32 as well as other write requests. A read request may be generated by the CPU 12 to read the header portion 46 and/or the data portion 48 of the data packet 44.

If step 104 is false, the interface controller 66 returns to step 104. If step 104 is true, the interface controller 66 continues with step 106. In step 106, the address check circuit 68 of the interface controller 66 determines whether the read or write address from the CPU 12 or the network adaptor 32 is associated with the header portion 46. If step 106 is false, the interface controller 66 reads data from or writes data to high latency memory 16 in step 108. If step 106 is true, the interface controller 66 reads a header portion 46 from or writes a header portion 46 to the low latency memory 14 in step 110. The interface controller 66 also reads the data portion 48 from or writes the data portion to the high latency memory if needed in step 112.

In a preferred embodiment, the header size is preferably set equal to an integer multiple of a word or cache line size of the CPU. The header locations are also preferably aligned with the word or cache lines of the CPU. For example, for a 64-bit CPU, the header size is set equal to x*64 where x is an integer. Suitable bit size values for the header include 64, 128, 192, 256, . . . .

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for operating a network device that receives data packets containing header portions and data portions, comprising:

specifying a maximum individual buffer size for said data packets and a header size for said header portions of said data packets;

specifying a base address and a buffer pool size to identify read and write addresses that are associated with said header portions;

allocating packet buffers in a buffer pool using said maximum individual buffer size; and using said maximum individual buffer size, said header size, said base address and said buffer pool size to identify read and write addresses that are associated with said header portions of said data packets.

2. The method of claim 1 further comprising:

storing said header portions in low latency memory;

reading said header portions from said low latency memory; and writing said header portions to said low latency memory.

3. The method of claim 2 further comprising:

storing said data portions in high latency memory;

reading said data portions from said high latency memory; and writing said data portions to said high latency memory.

4. The method of claim 1 wherein said header size is preferably set equal to an integer multiple of a cache line size of a CPU.

5. A method for operating a network device that receives data packets containing header portions and data portions, comprising:

specifying a maximum individual buffer size for said data packets and a header size for said header portions of said data packets;

specifying a base address and a mask to identify read and write addresses that are associated with said header portions, allocating packet buffers in a buffer pool using said maximum individual buffer size; and using said maximum individual buffer size, said header size, said base address and said mask to identify read and write addresses that are associated with said header portions of said data packets.

6. A network device that receives data packets, comprising:

a low latency memory with a first read/write speed;

a high latency memory with a second read/write speed that is slower than said first read/write speed of said low latency memory;

an interface controller that stores header portions of said data packets in said low latency memory and data portions of said data packets in said high latency memory, and that includes an address check circuit that determines whether a read address from one of said CPU and said network adaptor is associated with one of said header portions that is stored in said low latency memory, that reads said header portion from said low latency memory if said read address is associated with one of said header portions, and that accesses registers to identify addresses corresponding to said header portions, and wherein said registers include:

a base address register;
a buffer pool size register;
a maximum individual buffer size register; and
a header size register; and a central processing unit (CPU) and a network adaptor that communicate with said interface controller and that read from and write to said data packets.

7. The network device of claim 6 wherein said address check circuit determines whether a write address from one of said CPU and said network adaptor is associated with a header portion, and wherein if said write address is associated with said header portion, said interface controller writes said header portion to said low latency memory.

8. The network device of claim 6 wherein said low latency memory is static random access memory and said high latency memory is dynamic random access memory.

9. The network device of claim 6 wherein said low latency memory is embedded memory.

10. The network device of claim 6 wherein said header size is preferably set equal to an integer multiple of a cache line size of said CPU.

11. A network device that receives data packets, comprising:

a low latency memory with a first read/write speed;

a high latency memory with a second read/write speed that is slower than said first read/write speed of said low latency memory;

an interface controller that stores header portions of said data packets in said low latency memory and data portions of said data packets in said high latency memory, and that includes an address check circuit that determines whether a read address from one of said CPU and said network adaptor is associated with one of said header portions that is stored in said low latency memory, that reads said header portion from said low latency memory if said read address is associated with one of said header portions, and that accesses registers to identify addresses corresponding to said header portions, and wherein said registers include:

a base address register;
a mask register;
a maximum individual buffer size register; and
a header size register; and a central processing unit (CPU) and a network adaptor that communicate with said interface controller and that read from and write to said data packets.

12. A method of operating a network device that receives data packets including header portions and data portions from a network adaptor, comprising:

receiving said data packets from said network adaptor using an interface controller;

storing header portions of said data packets in low latency memory by identifying said header portions of said data packets from a write address provided by said network adaptor;

storing data portions of said data packets in high latency memory using said write address;

receiving a read address from one of a central processing unit (CPU) and said network adaptor;

checking said read address using said interface controller to determine whether said read address is associated with a header portion;

reading said header portion from said low latency memory if said read address is associated with said header portion;

receiving a second write address from one of said CPU and said network adaptor;

checking said second write address using said interface controller to determine whether said second write address is associated with a header portion;

writing said header portion to said low latency memory if said second write address is associated with said header portion;

specifying a maximum individual buffer size for said data packets and a header size for said header portions of said data packets;

allocating buffers in a buffer pool using said maximum individual buffer size; and using a base address and a buffer pool size to identify said read and write addresses that are associated with said header portions.

13. The method of claim 12 wherein said header size is preferably set equal to an integer multiple of a cache line size of said CPU.

14. A method of operating a network device that receives data packets including header portions and data portions from a network adaptor, comprising:

receiving said data packets from said network adaptor using an interface controller;

storing header portions of said data packets in low latency memory by identifying said header portions of said data packets from a write address provided by said network adaptor;

storing data portions of said data packets in high latency memory using said write address;

receiving a read address from one of a central processing unit (CPU) and said network adaptor;

checking said read address using said interface controller to determine whether said read address is associated with a header portion;

reading said header portion from said low latency memory if said read address is associated with said header portion;

receiving a second write address from one of said CPU and said network adaptor;

checking said second write address using said interface controller to determine whether said second write address is associated with a header portion;

writing said header portion to said low latency memory if said second write address is associated with said header portion;

specifying a maximum individual buffer size for said data packets and a header size for said header portions of said data packets;

allocating buffers in a buffer pool using said maximum individual buffer size; and using a base address and a mask to identify said read and write addresses that are associated with said header portions.

15. A network device that receives data packets, comprising:
   low latency memory means for handling data at a first read/write speed;
   high latency memory means for handling data at a second read/write speed that is slower than said first read/write speed of said low latency memory means;
   interface means for communicating with said low latency memory means and said high latency memory means, for receiving said data packets, and for storing header portions of said data packets in said low latency memory means and data portions of said data packets in said high latency memory means, wherein said interface means further includes:
     an address checking means for determining whether a read address from one of said central processing means and said network adapting means is associated with one of said header portions that is stored in said low latency memory means, and wherein if said read address is associated with one of said header portions, said interface means reads said header portion from said low latency memory means; and
     a plurality of registers, wherein said address checking means accesses said registers to identify addresses corresponding to said header portions, wherein said registers include:
       a base address register,
       a buffer pool size register,
       a maximum individual buffer size register, and
       a header size register; and
   processing and network adapting means for communicating with said interface means and for reading from and writing to said data packets.

16. The network device of claim 15 wherein said address checking means determines whether a write address from one of said central processing means and said network adapting means is associated with a header portion, and wherein if said write address is associated with said header portion, said interface means writes said header portion to said low latency memory means.

17. The network device of claim 15 wherein said low latency memory means is static random access memory and said high latency memory means is dynamic random access memory.

18. The network device of claim 15 wherein said low latency memory means is embedded memory.

19. The network device of claim 15 wherein said header size is preferably set equal to an integer multiple of a cache line size of said central processing means.

20. A network device that receives data packets, comprising:
   low latency memory means for handling data at a first read/write speed;
   high latency memory means for handling data at a second read/write speed that is slower than said first read/write speed of said low latency memory means;
   interface means for communicating with said low latency memory means and said high latency memory means, for receiving said data packets, and for storing header portions of said data packets in said low latency memory means and data portions of said data packets in said high latency memory means, wherein said interface means further includes:
     an address checking means for determining whether a read address from one of said central processing means and said network adapting means is associated with one of said header portions that is stored in said low latency memory means, and wherein if said read address is associated with one of said header portions, said interface means reads said header portion from said low latency memory means; and
     a plurality of registers, wherein said address checking means accesses said registers to identify addresses corresponding to said header portions, wherein said registers include:
       a base address register,
       a mask register,
       a maximum individual buffer size register, and
       a header size register; and
   processing and network adapting means for communicating with said interface means and for reading from and writing to said data packets.

21. A network, comprising:
   a network adaptor;
   an interface controller that receives said data packets from said network adaptor;
   a low latency memory having a first read/write performance;
   a high latency memory having a second read/write performance that is slower than said first read/write performance of said low latency memory,
   wherein said interface controller stores header portions of said data packets in low latency memory by identifying said header portions of said data packets from a write address from said network adaptor and stores data portions of said data packets in high latency memory using said write address; and
   a central processing unit (CPU), wherein one of said CPU and said network adaptor generates a read address, wherein said interface controller checks said read address to determine whether said read address is associated with a header portion, and wherein said interface controller reads said header portion from said low latency memory if said read address is associated with said header portion,
   wherein one of said CPU and said network adaptor generates a write address, wherein said interface controller checks said write address to determine whether said write address is associated with a header portion, and wherein said interface controller reads said header portion from said low latency memory if said write address is associated with said header portion,
   wherein said interface controller employs a maximum individual buffer size for said data packets and a header size for said header portions of said data packets and allocates buffers in a buffer pool of said high latency memory using said maximum individual buffer size, and
   wherein a base address and a buffer pool size are also used by said interface controller to identify said read and write addresses that are associated with said header portions.

22. The network of claim 21 wherein said header size is preferably set equal to an integer multiple of a cache line size of said CPU.

23. A network, comprising:
   a network adaptor;
   an interface controller that receives said data packets from said network adaptor;
   a low latency memory having a first read/write performance;

a high latency memory having a second read/write performance that is slower than said first read/write performance of said low latency memory, wherein said interface controller stores header portions of said data packets in low latency memory by identifying said header portions of said data packets from a write address from said network adaptor and stores data portions of said data packets in high latency memory using said write address; and a central processing unit (CPU), wherein one of said CPU and said network adaptor generates a read address, wherein said interface controller checks said read address to determine whether said read address is associated with a header portion, and wherein said interface controller reads said header portion from said low latency memory if said read address is associated with said header portion, wherein one of said CPU and said network adaptor generates a write address, wherein said interface controller checks said write address to determine whether said write address is associated with a header portion, and wherein said interface controller reads said header portion from said low latency memory if said write address is associated with said header portion, wherein said interface controller employs a maximum individual buffer size for said data packets and a header size for said header portions of said data packets and allocates buffers in a buffer pool of said high latency memory using said maximum individual buffer size, and wherein a base address and a mask are also used by said interface controller to identify said read and write addresses that are associated with said header portions.

24. A network, comprising:

low latency memory means for storing data and having a first read/write performance;

high latency memory means for storing data and having a second read/write performance that is slower than said first read/write performance of said low latency memory means;

network adapting means for handling packets and for generating write addresses;

interface means for storing header portions of said data packets in said low latency memory means by identifying said header portions of said data packets from said write addresses provided by said network adaptor and for storing data portions of said data packets in said high latency memory means using said write addresses;

central processing means for communicating with said interface means and for reading from and writing to said data packets, wherein when one of said central processing means and said network adaptor means generates a read address, said interface means checks said read address to determine whether said read address is associated with a header portion, and wherein said interface means reads said header portion from said low latency memory if said read address is associated with said header portion, wherein one of said central processing means and said network adaptor means generates a write address, wherein said interface means checks said write address to determine whether said write address is associated with a header portion, and wherein said interface means reads said header portion from said low latency memory if said write address is associated with said header portion, wherein said interface means employs a maximum individual buffer size for said data packets and a header size for said header portions of said data packets and allocates buffers in a buffer pool using said maximum individual buffer size, and wherein a base address and a buffer pool size are used by said interface means to identify said read and write addresses that are associated with said header portions.

25. The network of claim 24 wherein said header size is preferably set equal to an integer multiple of a cache line size of said central processing means.

26. A network, comprising:

low latency memory means for storing data and having a first read/write performance;

high latency memory means for storing data and having a second read/write performance that is slower than said first read/write performance of said low latency memory means;

network adapting means for handling packets and for generating write addresses;

interface means for storing header portions of said data packets in said low latency memory means by identifying said header portions of said data packets from said write addresses provided by said network adaptor and for storing data portions of said data packets in said high latency memory means using said write addresses; and central processing means for communicating with said interface means and for reading from and writing to said data packets, wherein when one of said central processing means and said network adaptor means generates a read address, said interface means checks said read address to determine whether said read address is associated with a header portion, and wherein said interface means reads said header portion from said low latency memory if said read address is associated with said header portion, wherein one of said central processing means and said network adaptor means generates a write address, wherein said interface means checks said write address to determine whether said write address is associated with a header portion, and wherein said interface means reads said header portion from said low latency memory if said write address is associated with said header portion, wherein said interface means employs a maximum individual buffer size for said data packets and a header size for said header portions of said data packets and allocates buffers in a buffer pool using said maximum individual buffer size, and wherein a base address and a mask are used by said interface means to identify said read and write addresses that are associated with said header portions.

27. A network device that receives data packets containing header portions and data portions, comprising:

an interface controller that communicates with registers specifying a maximum individual buffer size for said data packets, a header size for said header portions of said data packets, a base address and a buffer pool size;

a low latency memory having a first read/write performance; and a high latency memory having a second read/write performance that is slower than said first read/write performance of said low latency memory, wherein said interface controller allocates buffers in a buffer pool in said high latency memory using said maximum individual buffer size and buffers in said low latency memory using said header size, and wherein said interface controller uses said maximum individual buffer size and said header size to identify read and write addresses that are associated with said header portions of said data packets, wherein said interface controller stores said header portions in low latency memory, reads said header portions from said low latency memory, and writes said header portions to said low latency memory and said data portions in high latency memory, reads said data portions from said high latency memory, and writes said data portions to said high latency memory, and wherein said interface controller uses said base address and said buffer pool size to identify said read and write addresses that are associated with said header portions.

28. The network device of claim 27 further comprising:

a central processing unit (CPU) that communicates with said interface controller; and a network adaptor that communicates with said interface controller.

29. The network device of claim 28 wherein said header size is preferably set equal to an integer multiple of a cache line size of said CPU.

30. A network device that receives data packets containing header portions and data portions, comprising:

an interface controller that communicates with registers specifying a maximum individual buffer size for said data packets, a header size for said header portions of said data packets, a base address and a mask;

a low latency memory having a first read/write performance; and a high latency memory having a second read/write performance that is slower than said first read/write performance of said low latency memory, wherein said interface controller allocates buffers in a buffer pool in said high latency memory using said maximum individual buffer size and buffers in said low latency memory using said header size, and wherein said interface controller uses said maximum individual buffer size and said header size to identify read and write addresses that are associated with said header portions of said data packets, wherein said interface controller stores said header portions in low latency memory, reads said header portions from said low latency memory, and writes said header portions to said low latency memory and said data portions in high latency memory, reads said data portions from said high latency memory, and writes said data portions to said high latency memory, and wherein said interface controller uses said base address and said mask to identify said read and write addresses that are associated with said header portions.

31. A network device that receives data packets containing header portions and data portions, comprising:

low latency memory means for storing data and having a first read/write performance;

high latency memory means for storing data and having a second read/write performance that is slower than said first read/write performance of said low latency memory means; and interface control means for communicating with said low and high latency memory means and including means for specifying a maximum individual buffer size for said data packets, a header size for said header portions of said data packets, a base address and a buffer pool size, wherein said interface control means allocates buffers in a buffer pool in said high latency memory means using said maximum individual buffer size and buffers in said low latency memory means using said header size, wherein said interface control means uses said maximum individual buffer size and said header size to identify read and write addresses that are associated with said header portions of said data packets, wherein said interface control means stores said header portions in low latency memory means, reads said header portions from said low latency memory means, and writes said header portions to said low latency memory means, stores said data portions in high latency memory means, reads said data portions from said high latency memory means, and writes said data portions to said high latency memory means, and wherein said interface control means uses said base address and said buffer pool size to identify said read and write addresses that are associated with said header portions.

32. The network device of claim 31 further comprising:

central processing means for communicating with said interface control means and for reading and writing said data packets; and network adaptor means for communicating with said interface control means and for reading and writing said data packets.

33. The network device of claim 32 wherein said header size is preferably set equal to an integer multiple of a cache line size of said central processing means.

34. A network device that receives data packets containing header portions and data portions, comprising:

low latency memory means for storing data and having a first read/write performance;

high latency memory means for storing data and having a second read/write performance that is slower than said first read/write performance of said low latency memory means; and interface control means for communicating with said low and high latency memory means and including means for specifying a maximum individual buffer size for said data packets, a header size for said header portions of said data packets, a base address and a mask, wherein said interface control means allocates buffers in a buffer pool in said high latency memory means using said maximum individual buffer size and buffers in said low latency memory means using said header size, wherein said interface control means uses said maximum individual buffer size and said header size to identify read and write addresses that are associated with said header portions of said data packets, wherein said interface control means stores said header portions in low latency memory means, reads said header portions from said low latency memory means, and writes said header portions to said low latency memory means, stores said data portions in high latency memory means, reads said data portions from said high latency memory means, and writes said data portions to said high latency memory means, and wherein said interface control means uses said base address and said mask to identify said read and write addresses that are associated with said header portions.

* * * * *

UNITED STATES PATENT AND TRADEMARK OFFICE
CERTIFICATE OF CORRECTION

PATENT NO. : 6,985,974 B1 Page 1 of 1
APPLICATION NO. : 10/167000
DATED : January 10, 2006
INVENTOR(S) : Eitan Medina It is certified that error appears in the above-identified patent and that said Letters Patent is hereby corrected as shown below:

In the Patent:
Column 5, Line 51: Insert --...-- after "48-2,"

Signed and Sealed this

First Day of August, 2006

JON W. DUDAS
*Director of the United States Patent and Trademark Office*